United States Patent [19]

Fitts

[11] Patent Number: 4,928,517

[45] Date of Patent: May 29, 1990

[54] SURFACE MEASURING INSTRUMENT LINK ARM ASSEMBLY

[75] Inventor: Frederick L. Fitts, Ann Arbor, Mich.

[73] Assignee: Precision Devices Inc., Milan, Mich.

[21] Appl. No.: 83,358

[22] Filed: Aug. 10, 1987

[51] Int. Cl.⁵ .............................................. G01B 5/28
[52] U.S. Cl. ...................................................... 73/105
[58] Field of Search ................................ 73/104, 105; 33/556–561, 572; 192/45

[56] References Cited

U.S. PATENT DOCUMENTS

| | | | |
|---|---|---|---|
| 2,471,009 | 5/1949 | Reason | 73/105 |
| 3,937,903 | 2/1976 | Osann, Jr. | 369/231 |
| 4,415,072 | 11/1983 | Shoji et al. | 192/45 |
| 4,462,162 | 7/1984 | McMurtry | 33/561 |
| 4,549,638 | 10/1985 | Johnston | 192/45 |
| 4,665,739 | 5/1987 | Mizuno | 73/105 |

FOREIGN PATENT DOCUMENTS 565625 12/1957 Italy ........................................ 192/45

Primary Examiner—Stewart J. Levy
Assistant Examiner—Robert R. Raevis

[57] ABSTRACT

An improved link arm assembly which couples a surface finish measuring instrument housing to an associated probe which is moved across a workpiece surface to evaluate surface finish characteristics. The link arm assembly enables a probe mounting arm to be rotated from an inoperative, generally vertical position to a rotated generally horizontal operating position in which the probe is positioned in contact with a workpiece surface. In accordance with the present invention, a clutching arrangement is provided which enables the probe mounting arm to be rotated freely from the operating to the normal position but which imposes fluid damping in the opposite direction of rotation which limits the angular velocity of the probe mounting arm and the impact forces which are imposed on the probe when it is being moved into contact with the workpiece. Accordingly, damaging high impact between the probe and workpiece is avoided.

5 Claims, 2 Drawing Sheets

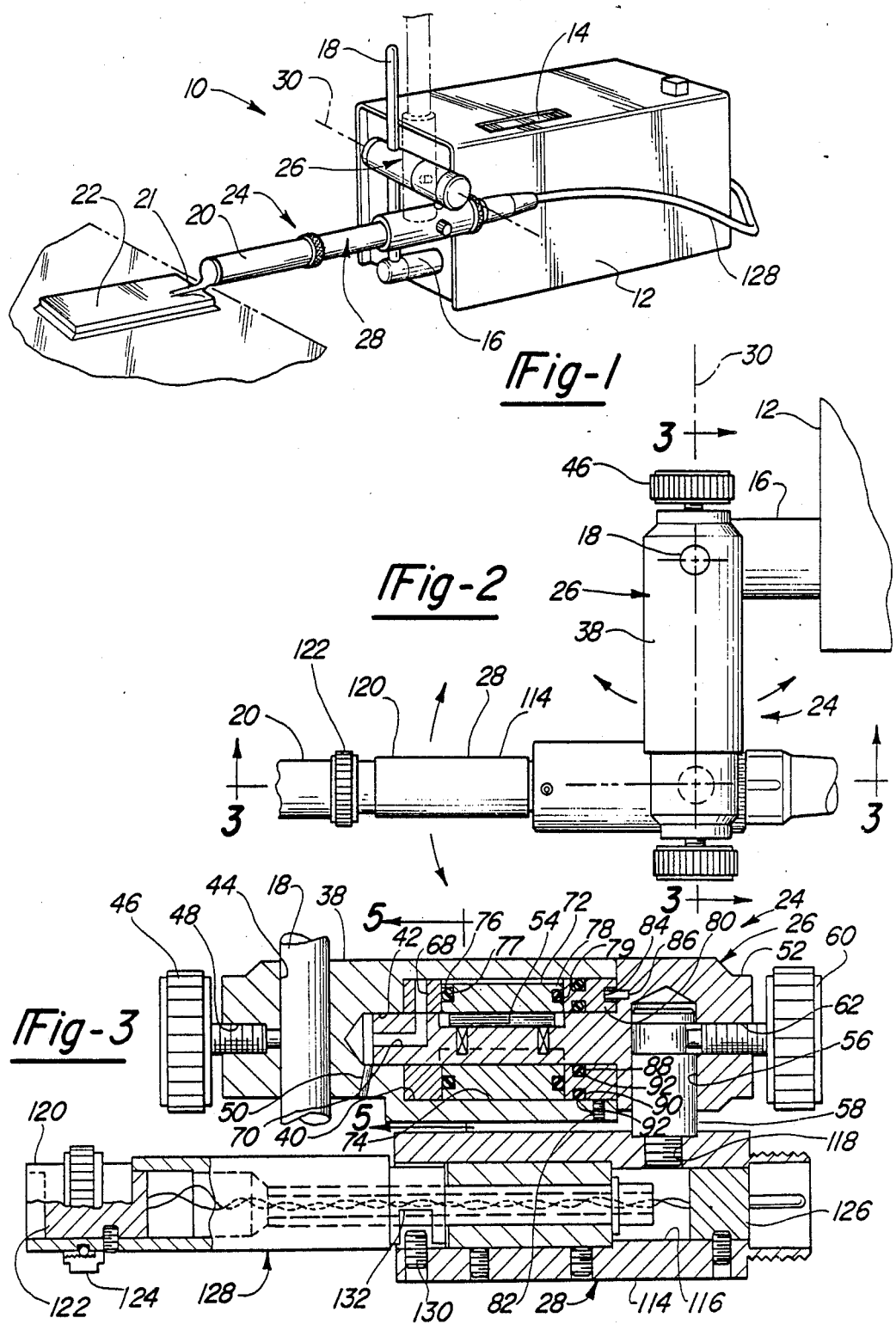

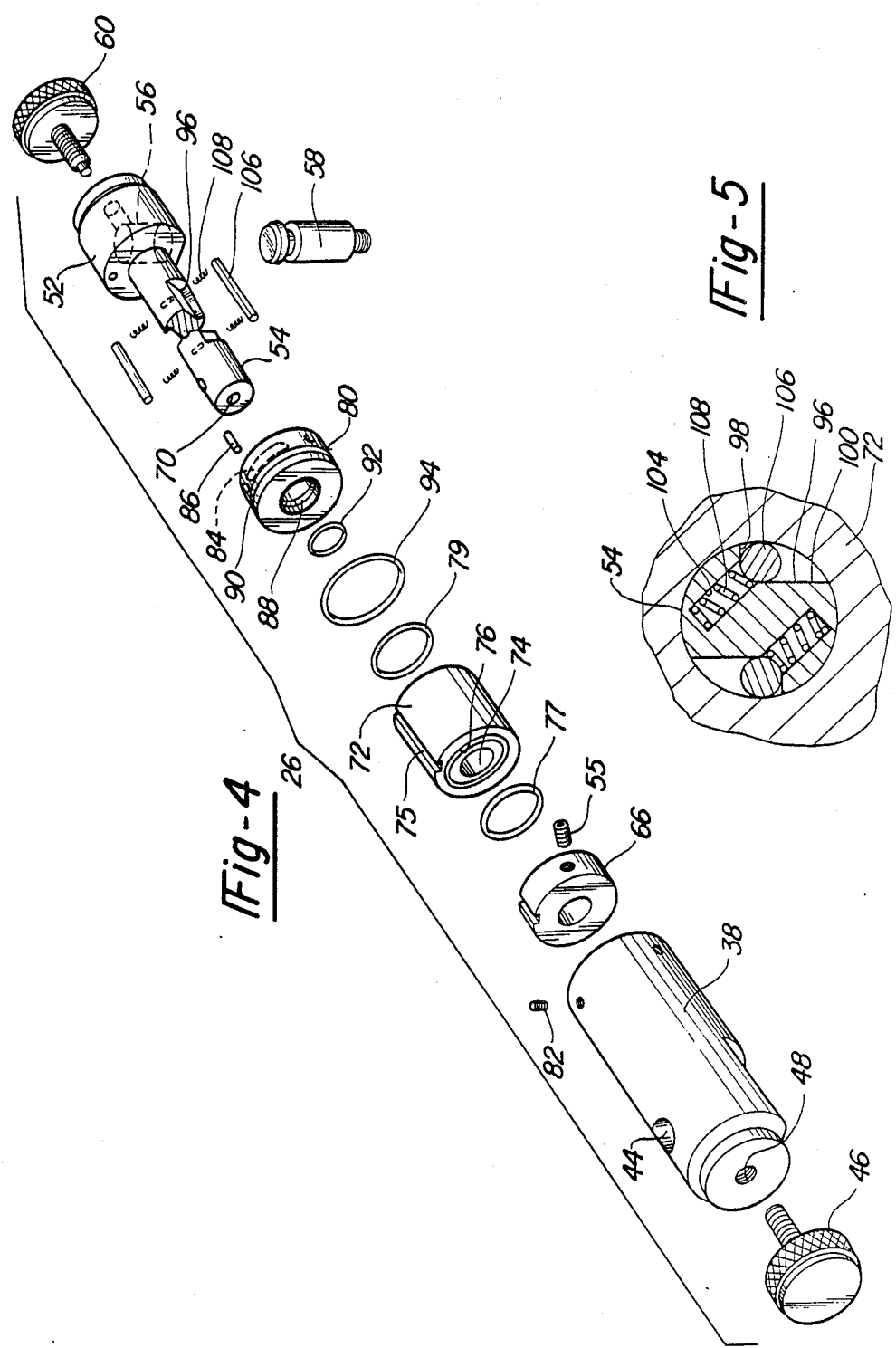

SURFACE MEASURING INSTRUMENT LINK ARM ASSEMBLY

BACKGROUND OF THE INVENTION

This invention relates to a linkage for coupling a surface measuring instrument to an associated sensing probe, and particularly, to such a linkage which protects the probe from damaging hard strikes against the workpiece surface being evaluated.

"Profilometers" and "Surfometers" (registered trademarks) are used to provide an assessment of surface finish of workpieces, typically machined metal parts. These types of surface finish measuring devices have a probe with a stylus which is moved across the surface being evaluated. Vibrations of the stylus are recorded and evaluated by the instrument in a manner similar to operation of the conventional phonograph. The sensing stylus is very fragile and sensitive and care must be exercised to ensure that it is gently placed against the workpiece surface to avoid damage to the stylus which can occur if it forcefully impacts the workpiece surface.

One type of surface finish measuring device has a stationary housing containing the instrumentation with a link arm extending from the housing which is pivotable about a horizontal axis so that the arm may be raised to a vertical position when not in use. The arm can be rotated downwardly to place the stylus into contact with the workpiece surface for evaluation. The device then causes the stylus to move across the workpiece surface and the vibrations of the stylus are received and processed, and one or more values characterizing surface finish are outputted. For conventional surface finish measuring devices, the link arm is freely rotatable, and therefore care by the operator must be taken to gently rotate the arm so that the probe does not simply-fall unimpeded against the workpiece surface. Unfortunately, such care is frequently not exercised by users necessitating replacement of the device's sensing probe.

In view of the foregoing, a need exists for a link arm assembly for surface finish measuring devices which prevents the probe from striking or "crashing" against the workpiece surface being evaluated.

SUMMARY OF THE INVENTION

The link arm assembly in accordance with the present invention is adapted for use with conventional surface finish measuring devices of the type described above. The assembly includes an internal clutching arrangement which permits the link arm to be freely rotated out of engagement with the workpiece, but imposes a controlled degree of viscous damping when the arm is rotated downwardly into contact with a workpiece. This damping controls the angular velocity of the arm when it is being moved to place the probe against a workpiece, such that the severity of the impact between the sensing probe and workpiece is controlled to an acceptable level.

Additional benefits and advantages of the present invention will become apparent to those skilled in the art to which this invention relates from the subsequent description of the preferred embodiments and the appended claims taken in conjunction with the accompanying drawings.

BRIEF DESCRIPTION OF THE DRAWINGS

FIG. 1 is a pictorial view of a surface finish measuring device including a link arm assembly in accordance with the present invention shown being positioned with the sensing probe in position to evaluate a workpiece surface.

FIG. 2 is a partial elevational view of the link arm assembly shown in FIG. 1.

FIG. 3 is a cross-sectional view taken along line 3—3 of FIG. 2.

FIG. 4 is an exploded pictorial view of the link arm pivot bearing assembly according to this invention.

FIG. 5, is a partial cross-sectional view taken along line 5—5 of FIG. 3, particularly showing the one-way clutch arrangement of the link arm pivot bearing assembly.

DETAILED DESCRIPTION OF THE INVENTION

FIG. 1 illustrates a surface measuring instrument with link arm assembly according to this invention which is generally designated by reference numeral 10. Instrument 10 includes a main housing 12 which encloses the electronic signal processing components of the system and further includes visual readout 14. Plunger 16 moves longitudinally into and out of housing 12 while measurements are being taken and has vertically extending post 18 attached thereto. Probe 20 having stylus tip 21 is moved across workpiece 22 in response to movement of plunger 16 and is coupled thereto by link arm assembly 24. Link arm assembly 24 includes pivot bearing assembly 26 and probe mounting arm 28. Probe mounting arm 28 is rotatable about axis 30 from a generally vertical-inoperative position shown in phantom lines in FIG. 1, to the downwardly rotated generally horizontal-operative position as shown in full lines in which stylus 21 is positioned in contact with workpiece 22.

In accordance with prior art devices, a pivot bearing assembly provides low friction movement in both rotational directions, thus requiring operator care when rotating probe 20 downwardly to prevent damaging impact between workpiece 22 and stylus 21.

In accordance with the present invention, a novel pivot bearing assembly 26 is provided featuring viscous damping in one direction of rotation which limits the angular velocity of probe mounting arm 28 when rotated from the vertical to horizontal positions, thereby reducing the severity of impact imposed on stylus 21. Pivot bearing assembly 26, best shown in FIGS. 3 and 4, includes housing portion 38 defining a stepped internal bore having bore portions 40 and 42, and transverse bore 44. Transverse bore 44 receives post 18 and knurled lock screw 46 is provided which is threaded into bore 48 for locking pivot bearing assembly 26 at a particular vertical position on post 18. Housing 38 further defines a small diameter bore 50 which communicates the exterior of housing 38 with bore portion 42.

Spindle 5 includes axle 54 which extends within housing bore portions 40 and 42. Spindle 52 further defines transverse bore 56 which receives pin 58. Knurled lock screw 60 is threaded into bore 62 and enables the rotated position of pivot bearing assembly 26 with respect to pin 58 to be fixed.

Retaining spool 66 is affixed to axle 54 by set screw 55 and includes a radial lubricant feed hole 68 which communicates with feed hole 70 of the post. Bushing 72 having inside diameter portion 74 also fits within housing bore 40 surrounding axle 54. The axial ends of bushing 72 form seal grooves 76 and 78, with seals 77 and 79, respectively installed therein. Axial groove 75 runs longitudinally along the outside of bushing 72. Ring 80 also fits within housing bore 40 and is fixedly disposed therein by one or more set screws 82 installed from the exterior of housing 38. An arcuate groove 84 is also formed by ring 80, and establishes a range of angular motion of probe mounting arm 28 with respect to pivot bearing assembly 26 since pin 86 carried by spindle 52 interferes with the ends of the slot at the extreme limits of angular motion. Ring 80 further defines inner and outer seal grooves 88 and 90 with seals 92 and 94 installed therein, respectively.

The outer surface of axle 54 defines a pair of opposing grooves or pockets 96 having a configuration best shown in FIG. 5. Surface 98 of pocket 96 is oriented generally along a radial plane, whereas surface 100 is oriented transverse from that direction. Blind bores 104 are provided near the axial ends pockets 96. Rollers 106 are positioned within pockets 96 and are urged radially outward by springs 108 installed within bores 104.

Probe mounting arm 28, which is rotatable with respect to pivot bearing assembly 26 about pin 58 includes outer housing 114 having internal longitudinal bore 116 and transverse threaded bore 118. Pin 58 is threaded into bore 118. Probe mounting tip 120 includes an electrical connector 122 which is adapted to mate with a standard sensing stylus (not shown in FIG. 3) which is held in position by knurled threaded ring 124. Wires from connector 122 run through probe mounting tip 120 and terminate at connector 126 which is configured to connect with cable 128 shown in FIG. 1. Set screw 130 fits within arcuate slot 132 to permit a limited degree of rotation of probe mounting tip 120 about its longitudinal axis.

Operation of link arm assembly 24 will now be explained with particular reference to FIG. 3. Once the components are in their assembled position, a viscous damping material is injected through bore 50 and flows through feed holes 70 and 68, and into the radial gap between bushing 72 and housing bore 40. The damping material is contained by seals 77, 79 and 90. Rollers 106 provide a one-way clutching action. With reference to FIG. 5, axle 54 is permitted to rotate freely in a clockwise direction with respect to bushing 72 since surface 98 is oriented to permit rollers 106 to slide along inside bore 74 of the bushing. Accordingly, in this direction of rotation, very low friction exist enabling probe mounting arm to be lifted to its vertical-inoperative position freely. In the opposite direction of rotation, however, rollers 106 frictionally engage bushing inside bore 74 since the rollers ride along surface 100 which causes them to become pinched or wedged into interference with the bushing bore. Once such interference occurs, bushing 72 is caused to rotate with axle 54. Accordingly, a one-way clutching arrangement is provided which is sensitive to the direction of relative rotation between axle 54 and bushing 72. When these components are locked together, bushing 72 is urged to rotate within housing bore 40. Due to the existence of a thin film of damping material at that interface, damping is providing through viscous shearing in that area. Rotation of probe mounting arm 28 from its upper inactive position to its downward operative condition is damped due to the above-described operation.

While the above description constitutes the preferred embodiments of the present invention, it will be appreciated that the invention is susceptible to modification, variation and change without departing from the proper scope and fair meaning of the accompanying claims.

I claim:

1. A link arm assembly for coupling a surface finish measuring unit to a surface evaluating probe comprising:
   a probe mounting arm having mounting means for mounting said probe,
   a pivot bearing assembly having a first portion thereof coupled to said probe mounting arm and a second portion thereof coupled to said unit wherein said first and second portions are rotatable with respect to each other such that said probe mounting arm is movable between a normal generally vertical position to an operating generally horizontal position in which said probe rests on a workpiece, and
   clutching means for permitting said probe mounting arm to be freely moved from said operating to said normal position but providing damping when said probe mounting arm is moved from said normal to said operating position thereby limiting the impact forces acting on said probe when contacting said workpiece.

2. A link arm assembly defined in claim 1 wherein said pivot bearing second portion contains a bore, and said first portion having an axle extending into said bore, and a bushing surrounding said axle and fitting within said bore, said clutching means being defined by at least one pocket formed by said axle with a roller element carried by said pocket, said pocket having wall surfaces such that said roller element locks with said bushing causing said bushing to rotate in said second portion bore and wherein a damping fluid is present between said bushing and said bore providing fluid damping when said probe mounting arm is moved from said normal to said operating position, and said roller element disengaging said bushing when said axle is rotated from said operating to said normal position.

3. A link arm assembly defined in claim 2 wherein said axle defines two pockets each carrying a roller element.

4. A link arm assembly defined in claim 2 wherein said axle further comprises spring means acting on said roller element urging said roller element radially outward against said bushing.

5. A link arm assembly for coupling a surface measuring unit to a surface evaluating probe comprising:
   a probe mounting arm having mounting means for mounting said probe;
   a pivot bearing assembly having a spindle coupled to said probe mounting arm, said spindle having an extending axle having at least one pocket formed on the outside surface thereof, said pivot bearing assembly further having a housing coupled to said unit and forming an internal bore, said spindle and said housing being rotatable with respect to each other such that said probe mounting arm is moveable between a normal generally vertical position to an operating generally horizontal position in which said probe rests on a workpiece; and
   clutching means for permitting said probe mounting arm to be freely moved from said operating to said normal position but providing damping when said probe mounting arm is moved from said normal to said operating position thereby limiting the impact forces acting on said probe when contacting said workpiece, such clutch means including a bushing encircling said axle and disposed in said housing internal bore, a roller element carried by said pocket, said pocket configured such that said axle and said bushing are locked together in one direction of rotation wherein a damping material between said bushing and said housing bore provides said damping when said probe mounting arm is moved from said normal to said operating position and said roller element disengaging said bushing in the opposite direction of rotation providing said free movement of said probe mounting arm when moved from said operating to said normal position.

* * * * *